United States Patent
Wohlschlegel et al.

(10) Patent No.: US 11,050,653 B2
(45) Date of Patent: Jun. 29, 2021

(54) TELEMETRY CAPTURE SYSTEM FOR STORAGE SYSTEMS

(71) Applicant: Burlywood, Inc., Longmont, CO (US)

(72) Inventors: Amy Lee Wohlschlegel, Lafayette, CO (US); Christopher Bergman, Erie, CO (US); David Christopher Pruett, Longmont, CO (US); Edoardo Daelli, Longmont, CO (US); Erik Habbinga, Fort Collins, CO (US); John Foister Murphy, Berthoud, CO (US); John William Slattery, Boulder, CO (US); Kevin Darveau Landin, Longmont, CO (US); Nathan Koch, Longmont, CO (US); Tod Roland Earhart, Longmont, CO (US); Will Allan Loechel, Longmont, CO (US)

(73) Assignee: Burlywood, Inc., Longmont, CO (US)

( * ) Notice: Subject to any disclaimer, the term of this patent is extended or adjusted under 35 U.S.C. 154(b) by 0 days.

(21) Appl. No.: 16/898,859

(22) Filed: Jun. 11, 2020

(65) Prior Publication Data
US 2020/0396151 A1     Dec. 17, 2020

Related U.S. Application Data

(60) Provisional application No. 62/860,091, filed on Jun. 11, 2019.

(51) Int. Cl.
*G06F 15/16*     (2006.01)
*H04L 12/26*     (2006.01)
*H04L 29/08*     (2006.01)

(52) U.S. Cl.
CPC ........ *H04L 43/106* (2013.01); *H04L 43/0817* (2013.01); *H04L 43/0882* (2013.01); *H04L 43/0894* (2013.01); *H04L 67/1097* (2013.01)

(58) Field of Classification Search
CPC .............. H04L 43/106; H04L 43/0817; H04L 43/0882; H04L 43/0894; H04L 67/1097
USPC ........................................................ 709/224
See application file for complete search history.

(56) References Cited

U.S. PATENT DOCUMENTS

| | | | |
|---|---|---|---|
| 6,336,171 B1 * | 1/2002 | Coskrey, IV | G06F 3/0619 711/152 |
| 7,133,363 B2 * | 11/2006 | Takase | H04L 49/205 370/230 |
| 7,953,926 B2 * | 5/2011 | Yang | G06F 12/0866 711/113 |

(Continued)

FOREIGN PATENT DOCUMENTS

WO     2014/126604 A1     8/2014

OTHER PUBLICATIONS

International Application No. PCT/US2020/037197, International Search Report & Written Opinion, 10 pages, dated Sep. 4, 2020.

(Continued)

*Primary Examiner* — Moustafa M Meky (57) ABSTRACT

A method of operating a telemetry capture system within a data storage system comprising storage devices is provided. The method includes generating a telemetry packet, and providing the telemetry packet to one or more taps via a telemetry path independent of data and control paths within the storage devices. The method also includes capturing the telemetry packet in one or more of the taps, and generating real-time telemetry data based at least on the telemetry packet.

20 Claims, 4 Drawing Sheets

(56) References Cited

U.S. PATENT DOCUMENTS

| | | | |
|---|---|---|---|
| 8,516,079 B2* | 8/2013 | Hsueh | G06F 9/452 |
| | | | 709/219 |
| 8,521,926 B2* | 8/2013 | Hsueh | G06F 3/1454 |
| | | | 710/62 |
| 10,620,840 B2* | 4/2020 | Freyensee | G06F 3/0659 |
| 10,798,159 B2* | 10/2020 | Eggert | H04L 67/1097 |
| 2005/0159169 A1 | 7/2005 | Humphries et al. | |
| 2007/0250673 A1* | 10/2007 | Eidswick | G06F 11/1461 |
| | | | 711/162 |
| 2015/0229582 A1 | 8/2015 | Zhu et al. | |
| 2016/0043956 A1 | 2/2016 | Eggleston et al. | |
| 2016/0328273 A1 | 11/2016 | Molka et al. | |
| 2017/0060769 A1 | 3/2017 | Wires et al. | |
| 2017/0132035 A1* | 5/2017 | Hsieh | G06F 3/0659 |
| 2018/0024739 A1 | 1/2018 | Schmisseur | |
| 2019/0102301 A1* | 4/2019 | Li | H04L 45/74 |
| 2020/0241749 A1* | 7/2020 | Freyensee | G06F 3/0683 |

OTHER PUBLICATIONS

Zhu, Yibo et al., "Packet-Level Telemetry in Large Datacenter Networks," SIGCOMM '15, 13 pages, Aug. 17-21, 2015.

* cited by examiner

TELEMETRY CAPTURE SYSTEM FOR STORAGE SYSTEMS

RELATED APPLICATIONS

This application hereby claims the benefit of and priority to U.S. Provisional Patent Application No. 62/860,091, titled "NON-INTRUSIVE TELEMETRY CAPTURE SYSTEM FOR STORAGE DRIVES", filed on Jun. 11, 2019 and which is hereby incorporated by reference in its entirety.

TECHNICAL FIELD

Aspects of the disclosure are related to data storage and in particular to capturing real-time telemetry of data traffic within a storage system.

TECHNICAL BACKGROUND

Storage systems are complicated and multi-layered. The behavior (performance, life, reliability, etc.) of the storage devices in these systems is highly dependent on the traffic patterns presented to the devices. It is often difficult for end users to fully understand how their actions impact the traffic patterns and ultimately the storage devices present in their systems. Even knowledgeable users can be surprised by the impacts of operating systems, host bus adapters, network stacks, and other components between their application and the final storage device.

Traffic can be aggregated, disaggregated, buffered, flushed, or otherwise delayed or manipulated before reaching the storage device. The only true way to know the final traffic pattern presented to a storage device is to monitor the traffic at the device. There are some solutions to this issue today, but none scale to allow reasonable capture of information across a large number of storage devices over a relatively long period of time.

For example, bus analyzers support real-time capture of the traffic on a storage system bus and can be inserted right at the input of the storage device so the true traffic pattern seen by the device can be observed. However, these devices are costly, require specialized interconnect to be inserted between the storage device and the rest of the storage system, have somewhat limited buffer/capture depth, and do not provide visibility into the internal behavior of the storage device. Bus analyzers also do not scale to monitoring many storage devices in a storage system simultaneously due to cost and interconnect challenges.

Traffic can be monitored at the host/application level, but this can be costly in terms of memory and processor cycles on the host system. This information can also be misleading because it may not represent what the storage device actually sees after the traffic travels through the multiple layers in the storage system.

Most storage devices provide the number of bytes written to/read from the device and its underlying media. This can yield high level write amplification information as the device ages, but does not provide insight into the driving factors of the write amplification or the ability to easily monitor the temporal behavior of the write amplification.

Embedded processor trace modules can be used to monitor code execution of a storage device and collect some statistics related to the code execution, but similar to bus analyzers these devices are costly, require special interconnect to the storage device (which may be expressly forbidden by some customers for security; e.g. fuses getting blown so that the traces cannot be used in a customer environment), and have limited buffer/capture depth.

Overview

In an embodiment, a method of operating a telemetry capture system within a data storage system comprising storage devices is provided. The method includes generating a telemetry packet, and providing the telemetry packet to one or more taps via a telemetry path independent of data and control paths within the storage devices. The method also includes capturing the telemetry packet in one or more of the taps, and generating real-time telemetry data based at least on the telemetry packet.

In another embodiment, a storage controller for controlling storage devices within a storage system is provided. The storage controller includes a host interface, configured to receive host data for storage within the storage system, a storage interface, configured to transmit storage data to the storage system, and processing circuitry coupled with the host interface and the storage interface.

The processing circuitry is configured to generate a telemetry packet, and provide the telemetry packet to one or more taps via a telemetry path independent of data and control paths within the storage devices. The processing circuitry is also configured to capture the telemetry packet in one or more of the taps, and generate real-time telemetry data based at least on the telemetry packet.

In a further embodiment, a storage device is provided. The storage device includes a data storage medium, and a storage controller coupled to the data storage medium and configured to store data onto the data storage medium.

The storage controller is configured to generate a plurality of telemetry packets, wherein a telemetry packet is generated for each IO command executed by the storage device, and wherein each telemetry packet includes identifying information for a type of event, event specific payload information, a timestamp, and a sequence number.

The storage controller is also configured to provide the plurality of telemetry packets as a telemetry stream to one or more taps via a telemetry path independent of data and control paths within the storage devices. The storage controller is further configured to capture at least one telemetry packet in one or more of the taps, and to generate real-time telemetry data based at least on the at least one telemetry packet during normal operation of the storage device.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The example embodiments described herein illustrate different methods for a telemetry capture system within a data storage system. A non-intrusive telemetry capture system is discussed below that allows for real-time or offline analysis of workloads and their impacts on a storage device.

The non-intrusive telemetry capture system provides for workload analysis and resultant optimization of a storage device. The analysis can be used to alter the storage device's configuration and operation to optimize device behavior and performance.

The embodiments described herein solve those issues, present some examples of key traffic pattern metrics, and describe how that information is used to properly optimize a storage device's behavior (performance, life, reliability, etc.) based on the observed traffic patterns. All of this is accomplished with little to no impact to the performance of the storage system so that the observation does not impact the overall result.

A number of technical terms and abbreviations are used in describing the various embodiments of the non-intrusive telemetry capture system described below and are defined as follows.

Data block—Smallest unit of storage readable or writable from the storage device medium. Typically, a big multiple of logical block size, i.e. 262,144 bytes. Multiple logical blocks are written to one data block.

Logical Block—Smallest unit of storage accessible over a host interface. Typically, 512 or 4096 bytes.

LBA—Logical Block Address. Integer used to uniquely access a logical block of storage. Address range is typically 48-bits (i.e. $[0:2^{48}-1]$, or $[0:2.8\times10^{14}]$. An 8 TB storage device would have an LBA address range of $[0:8\times10^{12}-1]$.

IO Command—Input/Output command. A command to a storage device that causes data to be written to the storage device (input) or read from the storage device (output).

Storage Device—A device that accepts IO commands reading/writing logical blocks from/to data blocks.

Storage Device Media—Memory (typically non-volatile) where logical block data is stored in data blocks.

Traffic Pattern—A data stream and its characteristics, for example, sequential writes, random writes, mixed read/write as well as their distribution in time.

Workload—See Traffic Pattern.

FTL (Flash Translation Layer) or Media Management Layer—A layer of software with knowledge of how data needs to be written to the storage medium. Translates logical block addresses to their location on the storage medium.

FTL or Media Management Table/Map—The map within the FTL or media management layer that describes the location of logical blocks on the storage medium, herein referred to as 'map'.

Direct/Flat Map Table—A type of map used in an FTL that has an entry for each logical block describing its location on non-volatile memory.

Extent Based Map Table—A type of map used in an FTL that uses extents to map logical blocks to their location on non-volatile memory.

Wear Leveling—The process of utilizing a storage device's medium in a uniform manner to extend the life/performance of the medium.

Garbage Collection—The process of moving valid logical blocks from data blocks in a storage device to free up unused space on a storage device's media.

Write Amplification (WA)—Factor of how much data is physically written to the storage device medium versus the data logically written to the storage device. If a previously written logical block needs to be moved on the storage device medium to a new location, that logical block would have a write amplification factor of 2 (i.e. it was written to the storage device medium twice).

Read Disturb—Reading certain types of media (including NAND flash) can increase the error rate of that media. This phenomenon is referred to as read disturb.

AI—Artificial Intelligence.

To effectively monitor the behavior of a storage device under a given workload or traffic pattern some key information for each IO command executed by the device must be captured as well as pertinent device state information. Examples of the types of information that are useful are: IO command type (read, write, flush, write with force unit access, etc.), IO command size (number of bytes or LBAs), IO command start/end times, measure of latency seen by the storage system, IO location (namespace, LBA, etc.—locality based on host perspective), media bytes written, media bytes read, critical events related to wear leveling and garbage collection, critical events related to data integrity, critical events related to temperature, power, and environmental conditions, flash operation performance, and internal hardware operation performance for performance tuning.

In an example embodiment of the present invention the information above is encapsulated in a packet of information called a telemetry packet as each associated event occurs. Each telemetry packet contains at least the following information: identifying information for the type of event, identifying information for the source of the telemetry packet, event specific payload information, a timestamp from a system-global time reference that is assigned as the packet is created (used to correlate events across the system and measure time between events), and a sequence number that is assigned by a tap as packets are serialized into their final destination (used to detect missing packets in lossy destinations independent of the packet timestamps). Optionally, telemetry packets may include a priority field containing priority information for use by funnels operating with a priority arbitration policy (described in detail below). Also optionally, telemetry packets may include an integrity-check field containing an Error Detection and Correction Code (ECC) or the like used to ensure that the telemetry packet is intact and contains no errors.

A high-performance storage system generates a large number of telemetry packets over a very short period of time. In order to maintain system performance, hardware acceleration of portions of the telemetry generation, capture, routing, filtering, and storage is provided in an example embodiment of the present invention. The example embodiment maintains device performance by providing a telemetry path independent of the storage system's main data and processing path as illustrated in FIG. 1.

Figure 1:
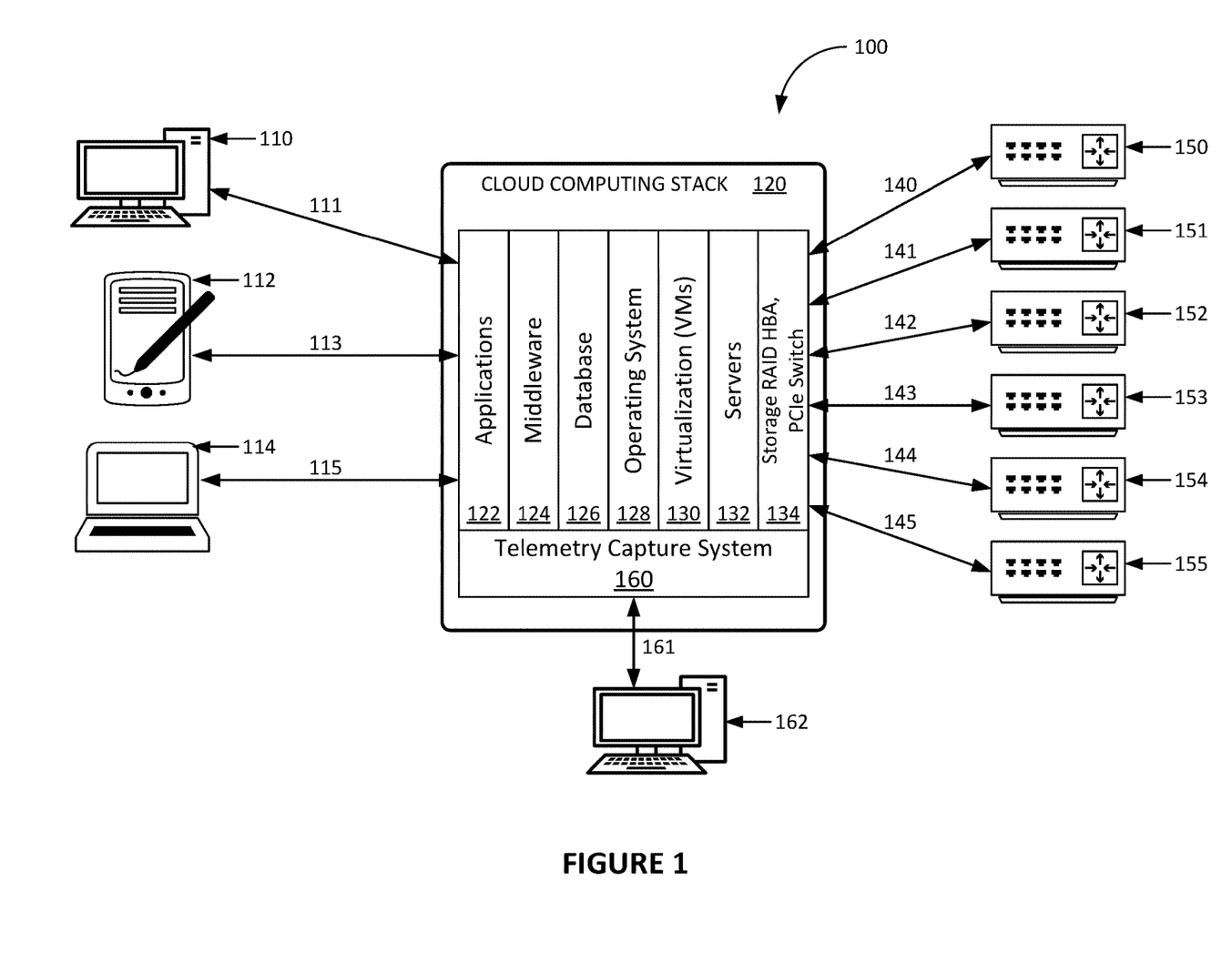
FIG. 1 illustrates a data storage system.

FIG. 1 illustrates data storage system 100. In this example embodiment of the present invention, data storage system 100 includes cloud computing stack 120 that sends and receives data to and from a variety of devices 110, 112, and 114 and also sends and receives data to a plurality of storage devices 150-155. In this configuration cloud computing stack 120 is operating as a storage controller between devices 110, 112, and 114 and storage devices 150-151.

In this example embodiment, cloud computing stack 120 comprises a number of layers including applications layer 122, middleware layer 124, database layer 126, operating system layer 128, virtualization layer 130, server layer 132, and storage RAID HBA, PCIe switch layer 134. In this example, cloud computing stack 120 also includes telemetry capture system 160, although other embodiments may have telemetry capture system 160 physically separate from cloud computing stack 120.

Cloud computing stack 120 communicates with device 110 over link 111, device 112 over link 113, and device 114 over link 115. Cloud computing stack 120 also communicates with storage devices 150-155 over links 140-145 respectively. Telemetry capture system 160 communicates with device 162 over link 161.

Cloud computing stack 120 may take any of a variety of configurations. In some examples, cloud computing stack 120 may be a Field Programmable Gate Array (FPGA) with software, software with a memory buffer, an Application Specific Integrated Circuit (ASIC) designed to be included in a single module with storage media, a set of Hardware Description Language (HDL) commands, such as Verilog or System Verilog, used to create an ASIC, a separate module from storage devices 150-155, or any of many other possible configurations.

Communication links 111, 113, 115, 140-145, and 161 may use the Internet or other global communication networks. Communication links 111, 113, 115, 140-145, and 161 may comprise one or more wireless links that can each further include Long Term Evolution (LTE), Global System for Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. The communication links can carry any communication protocol suitable for wireless communications, such as Internet Protocol (IP) or Ethernet.

Additionally, communication links 111, 113, 115, 140-145, and 161 can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. Communication links can each use metal, glass, optical, air, space, or some other material as the transport media. Communication links 111, 113, 115, 140-145, and 161 may each be a direct link, or may include intermediate networks, systems, or devices, and may include a logical network link transported over multiple physical links. Common storage links include SAS, SATA, NVMe, Ethernet, Fiber Channel, Infiniband, and the like.

In this example embodiment, when cloud computing stack 120 executes an IO command, it also creates a telemetry packet as described above and passes the telemetry packet to telemetry capture system 160 for processing. In some example embodiments, the telemetry packet is created within telemetry capture system 160. Telemetry capture system 160 then processes the telemetry packet as illustrated in detail in FIG. 2, and after processing, sends one or more reports to device 162 over link 161 for display to a user.

Telemetry capture system 160 provides a telemetry capture path that is independent of the storage devices 150-155 main data and control paths, and allows for real-time telemetry capture for storage devices 150-155. Storage system 100 may use the resulting real-time telemetry data to adjust storage device performance, life and reliability either offline or during run-time.

Some or all of the real-time telemetry data may be stored on one or more of storage devices 150-155 or within device 162. As illustrated in FIG. 1, telemetry capture system 160 is configured to collect telemetry data from a plurality of storage devices 150-155. In some embodiments, telemetry capture system 160 is configured to collect telemetry data over a target period of time.

While FIG. 1 illustrates a cloud computing environment, the present invention may be implemented within any of a wide variety of data storage systems.

Figure 2:
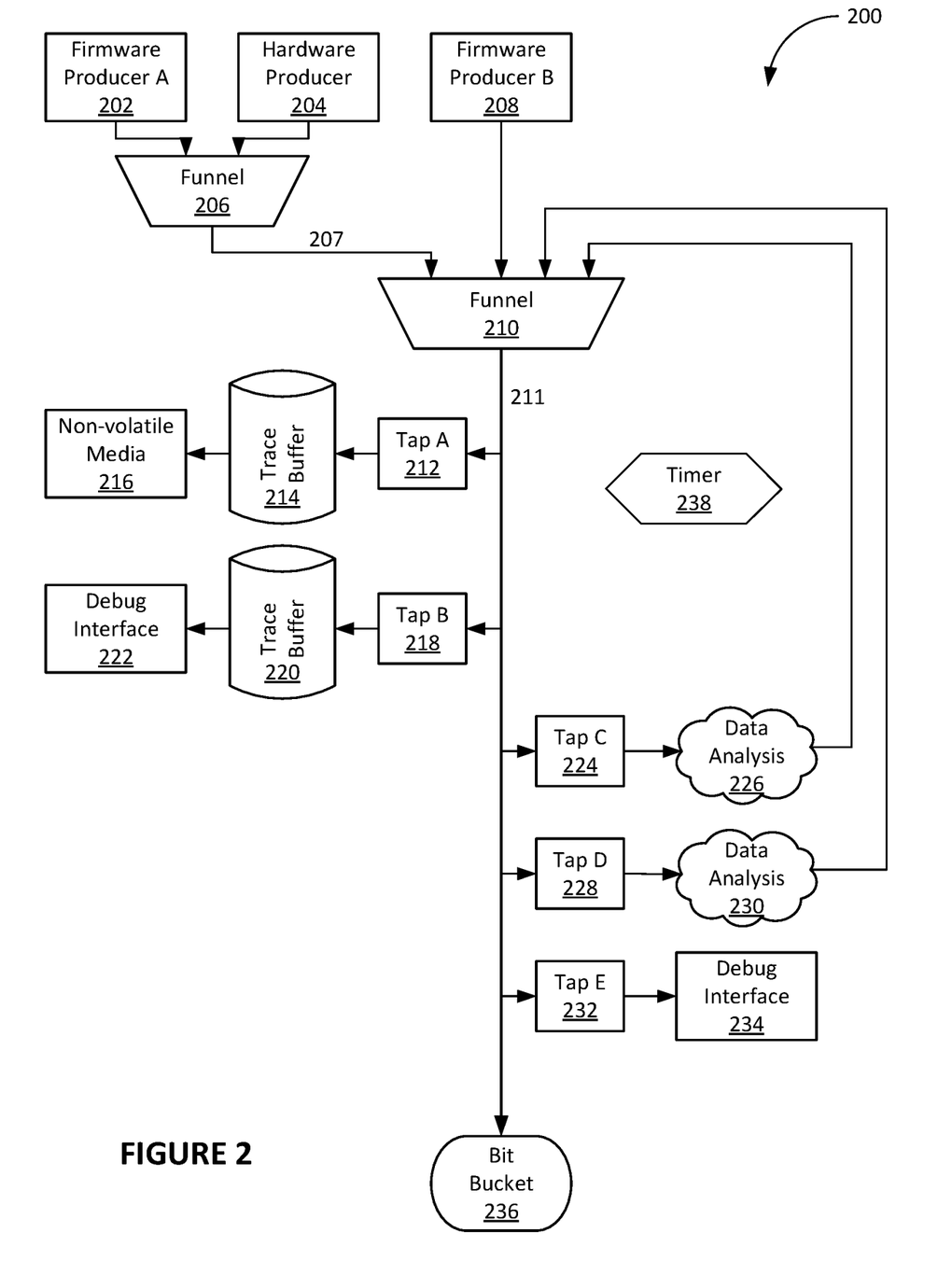
FIG. 2 illustrates a block diagram of a telemetry capture system for a data storage system.

FIG. 2 illustrates a block diagram of a telemetry capture system for a data storage system 200, such as telemetry capture system 160 illustrated in FIG. 1. In this example embodiment of a telemetry capture system 200, various blocks process a large quantity of telemetry packets generated by cloud computing stack 120.

Producers are components of the storage system that generate telemetry packets. Producers are implemented in hardware/logic or in firmware.

Funnels combine telemetry packets from two or more producers into one stream; they 'funnel' telemetry packets. Packets available at the inputs of a funnel are sent out the output as-is, without modification. If two or more packets are presented simultaneously, the funnel selects one based on a defined arbitration policy. Example arbitration policies include prioritizing using a packet priority or a round-robin scheme. Funnels never modify or drop packets.

Telemetry taps reside at the final point of the telemetry capture system 200 and monitor all telemetry packets. They extract packets of interest from the stream for further processing. All taps see all packets.

For example, individual taps may be configured to: copy packets of interest and write them into a buffer and store them to non-volatile media, copy packets of interest and write them into a buffer and send them out a debug interface, copy packets of interest (e.g. media errors, certain specific IO types/accesses) and accumulate them into performance monitors/counters, and alarm if the error rates get too high, or to copy packets of interest and stream them directly out a debug interface.

Taps may select a subset of packets and ignore others. The criteria for such filtering is application specific. Taps may not generate back-pressure.

Timer 238 is a system-wide time source used to identify the generation time for each telemetry packet. Timer 238 is used in correlating events from multiple producers and measuring the time between events.

Data analysis modules and event counters are components that receive a telemetry stream from a tap and perform analysis of that stream. Data analysis modules may also produce telemetry and inject telemetry back into the system via a funnel. Alternatively, the result of the analysis can be sent to a storage device so that the device's behavior can be monitored or adapted.

Some example functions of data analysis modules include: binning IOs into a histogram in real-time based on access type, LBA range, IO size, etc., counting and flagging certain types of media errors or events, and monitoring the IO pattern and using an AI algorithm to suggest changes in system behavior to better support the current traffic.

Data analysis modules and event counters can be implemented in either hardware or firmware. In one example embodiment, device 162 of FIG. 1 may operate as one or more data analysis module or event counter.

Trace buffers are memories configured to store telemetry streams captured by a tap. Trace buffers can either be circular and overwrite if they are not cleared before they are emptied, or they can stop capture once filled. They cannot backpressure the tap and telemetry stream, nor impact system performance.

Debug interfaces are interfaces used to extract the telemetry stream from the storage system in real-time, such as link 161 in FIG. 1. Example debug interfaces include: an ethernet port, a proprietary/custom high-speed interface, and the native host interface.

Non-volatile media is media present within the storage system that is not volatile and can store telemetry packets. In some example embodiments non-volatile media is a portion of the native media of the storage device, another media type present on the system for another purpose (e.g. boot image or table storage), or a dedicated media for the sole purpose of storing telemetry information.

Bit bucket 236 illustrates the fact that every packet is tossed in the bit bucket after being presented to all taps. Thus, only packets of interest by a particular tap are saved. They are not otherwise stored.

In this example embodiment, telemetry capture system 200 includes Firmware Producer A 202, Hardware Producer 204, and Firmware Producer B 208, all of which generate telemetry packets. Telemetry packets from Firmware Producer A 202 and Hardware Producer 204 are combined by Funnel 206 into a telemetry stream on telemetry path 207. Telemetry packets from telemetry stream 207, Firmware Producer B 208, and Data Analysis modules 226 and 230 are combined by Funnel 210 into a telemetry stream on telemetry path 211. Note that telemetry path 207 and telemetry path 211 are independent from main data and control paths within storage devices 250-255 and cloud computing stack 120.

The telemetry stream on telemetry path 211 is provided to all of the taps within telemetry capture system 200. Telemetry packets on telemetry path 211 may be captured by any, all, or none of the taps. Telemetry packets that are captured by none of the taps are discarded (as illustrated by bit bucket 236).

In this example embodiment, Tap A 212 selects a subset of telemetry packets from telemetry path 211 and passes them to Trace Buffer 214 for storage in Non-volatile Media 216. Tap B 218 selects a subset of telemetry packets from telemetry path 211 and passes them to Trace Buffer 220 which then passes them to Debug Interface 222, which passes them over link 161 to device 162 from FIG. 1, for further processing and analysis.

In this example embodiment, Tap C 224 selects a subset of telemetry packets from telemetry path 211 and passes them to Data Analysis module 226 for processing. Data Analysis module 226 then passes some or all of the telemetry packets back to Funnel 210 for further processing. Tap D 228 selects a subset of telemetry packets from telemetry path 211 and passes them to Data Analysis module 230 for processing. Data Analysis module 230 then passes some or all of the telemetry packets back to Funnel 210 for further processing. Tap E 232 selects a subset of telemetry packets from telemetry path 211 and passes them to Debug Interface 234, which then passes them over link 161 to device 162 from FIG. 1, for further processing and analysis.

Note that FIG. 2 illustrates one example embodiment of telemetry capture system 160 from FIG. 1. Many other configurations may be constructed as desired with any combination of the various elements within telemetry capture system 200. Further, in some embodiments, telemetry capture system 200 may be modified during use to provide further telemetry data for data storage system 100 as desired.

As one example, the telemetry capture system 200 illustrated in FIG. 2, may process a storage device write command as follows:

1. Hardware automation detects and starts processing a host write command. Hardware Producer 204 injects a telemetry packet indicating a host write command, its start time, starting LBA, number of LBAs, and a unique tag.

2. The generated telemetry packet flows through Funnel 206 onto telemetry path 207, then Funnel 210 onto telemetry path 211.

3. Tap A 212 detects the packet and writes it to Trace Buffer 214.

4. Tap B 218 is configured to ignore this type of packet and does nothing.

5. Tap C 224 collects this packet and feeds it to Data Analysis module 226 which performs stream detection.

6. Tap D 228 collects this packet and updates its histograms tracking command information within Data Analysis module 230.

7. Tap E 232 is configured to ignore this type of packet and does nothing.

8. Firmware on the storage device detects that this command triggered a garbage collection threshold and generates a telemetry packet via Firmware Producer A 202.

9. The generated telemetry packet flows through Funnel 206 and 210 onto telemetry path 211.

10. Taps B 218, C 224, and E 232 ignore the packet based on their configuration.

11. Tap A 212 detects the packet and writes it to Trace Buffer 214.

12. Tap D 228 detects the telemetry packet and updates its event counters for garbage collection events within Data Analysis module 230.

13. Hardware automation completes the host write command. Hardware Producer 204 injects a telemetry packet indicating a host write command, its end time, starting LBA, number of LBAs, and a unique tag.

14. The generated telemetry packet flows through Funnel 206 and 210 onto telemetry path 211.

15. Tap A 212 detects the packet and writes it to Trace Buffer 214.

16. Tap B 218 is configured to ignore this type of packet and does nothing.

17. Taps C 224 and D 228 are configured to ignore command completion packets and do nothing.

18. Tap E 232 is configured to ignore this type of packet and does nothing.

The example implementation described above provides the information necessary to optimize a storage device's behavior. This optimization can be done offline or in real-time. An exemplary offline process analyzes the data retrieved from the device either from one or more of the Debug Interfaces or the Non-volatile Media and uses that information to provide new configuration parameters for the storage device. An exemplary real-time process uses algorithms internal to the device to alter the behavior/configuration of the device as the device is operating. Both provide improved behavior based on the workloads presented to the device.

Examples of information useful for optimization of the storage devices that can be extracted from the telemetry include: locality of access (both read and write)—stream detection, random vs. sequential access, typical IO sizes (both read and write), use of flush or force unit access directives, command latency, number of media bytes written vs. host bytes written (write amplification metric), host and media bytes read, data integrity feedback (e.g. is a heavy centralized read workload causing data migrations and WA due to media read disturb), read/write mix, and how bursty the workload may be and how that burstiness changes over time.

Because all of the telemetry is time stamped by timer 238 all of the items above can be analyzed for temporal variances which can yield further insight into the optimization.

Also, analysis of the telemetry data can yield optimizations in many areas of the storage device's configuration that can in turn yield improvements in the device's overall cost, performance, life, reliability, etc. Many areas that can be optimized based on this analysis, For example, the proper media type can be chosen to match the write workload. The FTL mapping table can be chosen to fit the write workload (flat map vs. extent map vs. hybrid of both, table mapping unit size (4K, 8K, etc.), the ideal configuration may allow reductions in the device's memory requirements which can reduce cost). The proper amount of over-provisioning can be used (possible cost reduction). The garbage collection algorithms can be tuned (can increase life and improve performance and possibly cost if less media can be used). Wear leveling tuning can produce similar results as garbage collection tuning. Write stream detection algorithms can be configured to better write host data with similar properties to the proper area(s) of the storage device medium. Stream detection, mapping and relative QoS may be optimized (for example, detecting a range of high concentration of a particular table mapping unit size (e.g. 4K) and dynamically adding a partition and QoS for that traffic and migrating).

Figure 3:
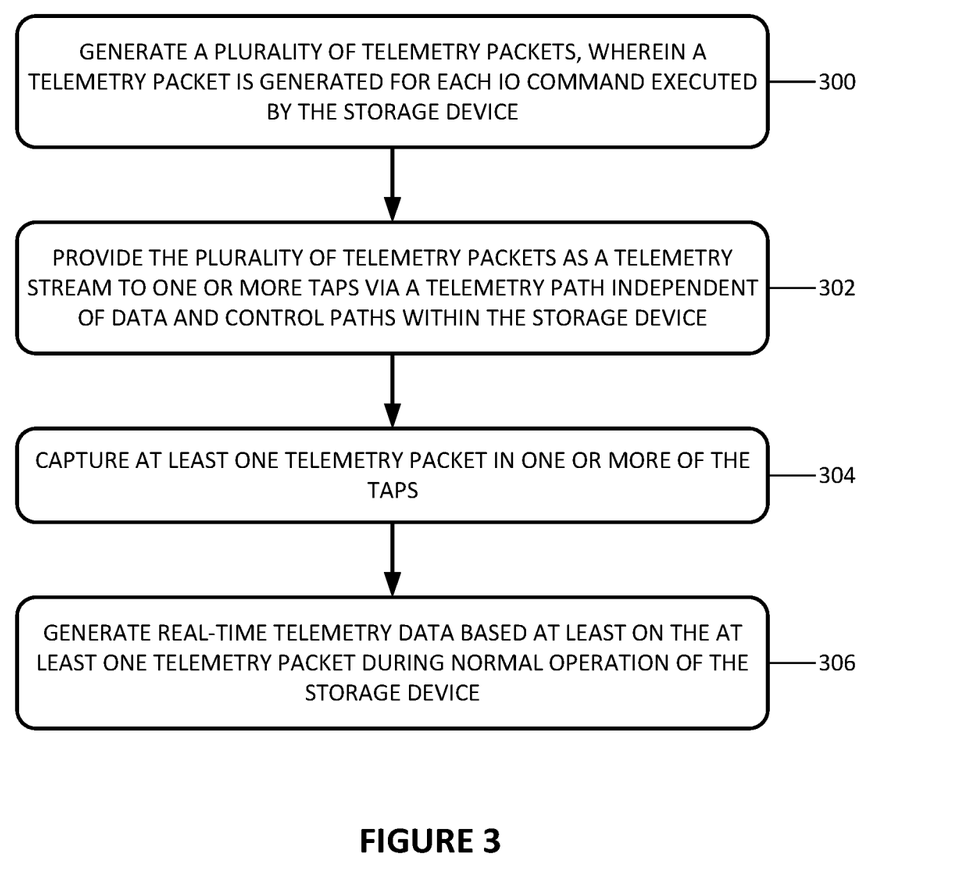
FIG. 3 illustrates an exemplary method for telemetry capture within a data storage system.

FIG. 3 illustrates an exemplary method for real-time telemetry capture within a data storage system. In this example, firmware and hardware producers generate a plurality of telemetry packets. A telemetry packet is generated at least for each IO command executed by a storage device within the storage system, (operation 300). Telemetry capture system 200 provides the plurality of telemetry packets as a telemetry stream to one or more taps 212, 218, 224, 228, and 232 via telemetry path 211 independent of data and control paths within the storage devices in the storage system, (operation 302).

One or more of taps 212, 218, 224, 228, and 232 capture at least one of the telemetry packets, (operation 304). Telemetry capture system 200 generates real-time telemetry data based at least on the at least one telemetry packet during normal operation of the data storage system, (operation 306).

Figure 4:
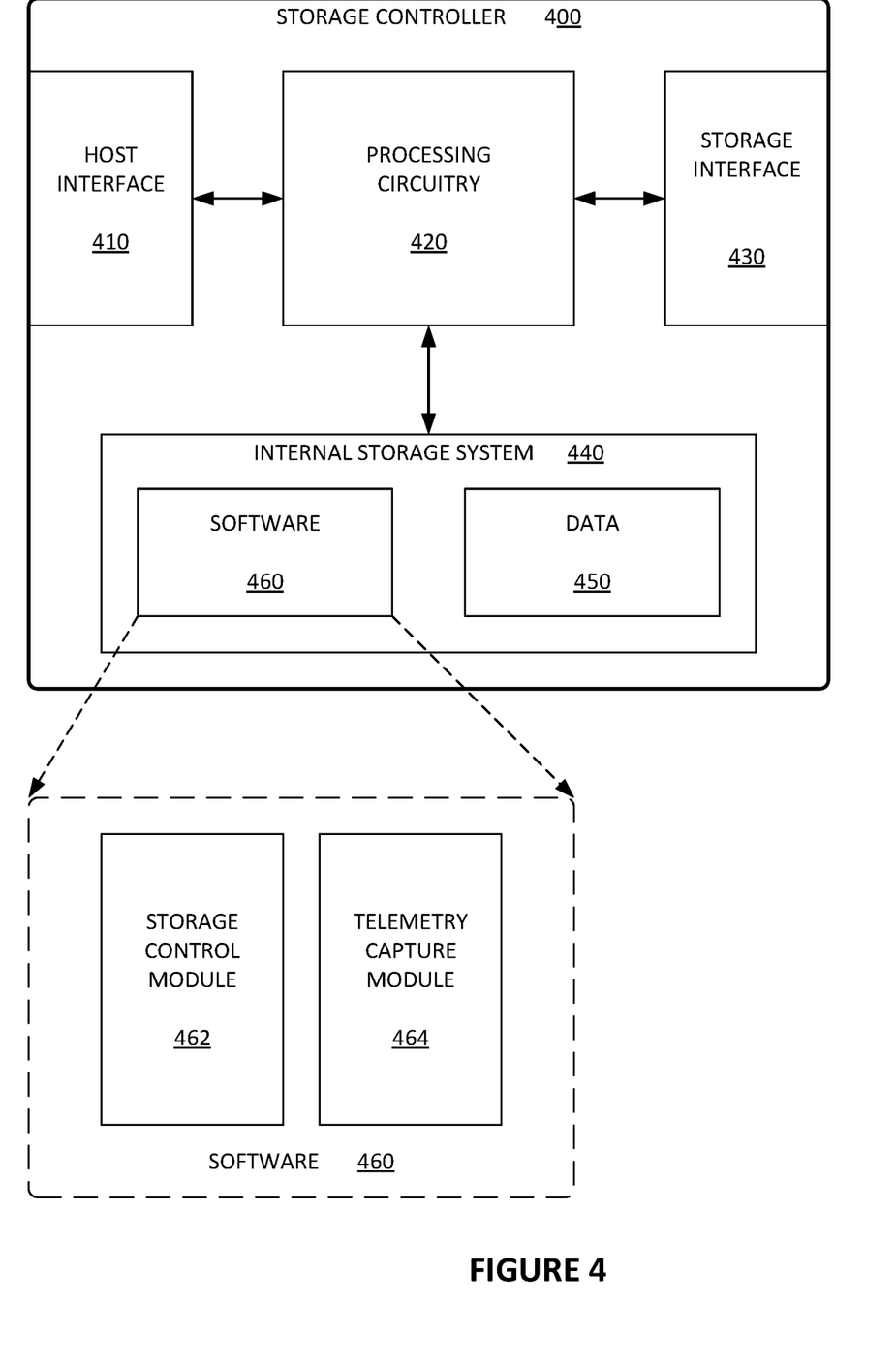
FIG. 4 illustrates a storage controller.

FIG. 4 illustrates storage controller 400, such as some or all of cloud computing stack 120 from FIG. 1. As discussed above, storage controller 400 may take on any of a wide variety of configurations. Here, an example configuration is provided for a storage controller implemented as an ASIC. However, in other examples, storage controller 400 may be built into a storage system or storage array, or into a host system.

In this example embodiment, storage controller 400 comprises host interface 410, processing circuitry 420, storage interface 430, and internal storage system 440. Host interface 410 comprises circuitry configured to receive data and commands from one or more external host systems and to send data to the host systems.

Storage interface 430 comprises circuitry configured to send data and commands to storage devices and to receive data from the storage devices. In some embodiments storage interface 430 may include ONFI ports for communicating with the storage devices.

Processing circuitry 420 comprises electronic circuitry configured to perform the tasks of a storage controller enabled to partition a write data stream into target partitions and inferred partitions as described above. Processing circuitry 420 may comprise microprocessors and other circuitry that retrieves and executes software 460. Processing circuitry 420 may be embedded in a storage system in some embodiments. Examples of processing circuitry 420 include general purpose central processing units, application specific processors, and logic devices, as well as any other type of processing device, combinations, or variations thereof. Processing circuitry 420 can be implemented within a single processing device but can also be distributed across multiple processing devices or sub-systems that cooperate in executing program instructions.

Internal storage system 440 can comprise any non-transitory computer readable storage media capable of storing software 460 that is executable by processing circuitry 420. Internal storage system 420 can also include various data structures 450 which comprise one or more databases, tables, lists, or other data structures. Storage system 440 can include volatile and nonvolatile, removable and non-removable media implemented in any method or technology for storage of information, such as computer readable instructions, data structures, program modules, or other data.

Storage system 440 can be implemented as a single storage device but can also be implemented across multiple storage devices or sub-systems co-located or distributed relative to each other. Storage system 440 can comprise additional elements, such as a controller, capable of communicating with processing circuitry 420. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 460 can be implemented in program instructions and among other functions can, when executed by storage controller 400 in general or processing circuitry 420 in particular, direct storage controller 400, or processing circuitry 420, to operate as described herein for a storage controller. Software 460 can include additional processes, programs, or components, such as operating system software, database software, or application software. Software 460 can also comprise firmware or some other form of machine-readable processing instructions executable by elements of processing circuitry 420.

In at least one implementation, the program instructions can include storage control module 462, and telemetry capture module 464. Storage control module 462 includes instructions directing processing circuitry 420 to operate a storage device, such as flash memory, including translating commands, encoding data, decoding data, configuring data, and the like. Telemetry capture module 464 includes instructions directing processing circuitry 420 to generate telemetry packets, process the telemetry packets, and provide real-time telemetry data as discussed in detail above with respect to FIG. 2.

In general, software 460 can, when loaded into processing circuitry 420 and executed, transform processing circuitry 420 overall from a general-purpose computing system into a special-purpose computing system customized to operate as described herein for a storage controller, among other operations. Encoding software 460 on internal storage system 440 can transform the physical structure of internal storage system 440. The specific transformation of the physical structure can depend on various factors in different implementations of this description. Examples of such factors can include, but are not limited to the technology used to implement the storage media of internal storage system 440 and whether the computer-storage media are characterized as primary or secondary storage.

For example, if the computer-storage media are implemented as semiconductor-based memory, software 460 can transform the physical state of the semiconductor memory when the program is encoded therein. For example, software 460 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a telemetry capture system within a data storage system comprising storage devices, the method comprising:
   generating a telemetry packet;
   providing the telemetry packet to one or more taps via a telemetry path independent of data and control paths within the storage devices;
   capturing the telemetry packet in one or more of the taps; and
   generating real-time telemetry data based at least on the telemetry packet.

2. The method of claim 1, wherein the generation of real-time telemetry data occurs during normal operation of the data storage system.

3. The method of claim 1, wherein a telemetry packet is generated for each IO command executed by the data storage system.

4. The method of claim 1, further comprising:
   adjusting a configuration of at least one of the storage devices based at least on the real-time telemetry data.

5. The method of claim 4, wherein the configuration of the at least one storage devices is adjusted during normal operation of the data storage system.

6. The method of claim 4, wherein the configuration of the at least one of the storage devices affects storage device performance, storage device life, or storage device reliability.

7. The method of claim 1, wherein the telemetry packet comprises:
   identifying information for a type of event;
   identifying information for a source of the telemetry packet;
   event specific payload information;
   a timestamp; and
   a sequence number.

8. The method of claim 7, wherein the event specific payload information comprises at least one element from the group of: IO command type, IO command size, IO command start/end times, latency, IO location, media bytes written, media bytes read, wear leveling event data, garbage collection event data, data integrity event data, environmental condition data, flash operation performance, and internal hardware operation performance.

9. The method of claim 1, further comprising:
   generating a plurality of telemetry packets; and
   providing the plurality of telemetry packets as a telemetry stream on the telemetry path.

10. The method of claim 9, wherein the one or more taps are configured to capture a subset of the plurality of telemetry packets.

11. The method of claim 1, further comprising:
    storing the real-time telemetry data on one or more of the storage devices; and
    generating the real-time telemetry data during a target period of time.

12. A storage controller for controlling storage devices within a data storage system, comprising:
    a host interface, configured to receive data from, and transmit data to, one or more host systems;
    a media interface, configured to transmit data to, and receive data from, the storage devices; and
    a processing system coupled with the host interface and the drive interface, configured to:
      generate a telemetry packet;
      provide the telemetry packet to one or more taps via a telemetry path independent of data and control paths within the storage devices;
      capture the telemetry packet in one or more of the taps; and
      generate real-time telemetry data based at least on the telemetry packet.

13. The storage controller of claim 12, wherein the processing system is further configured to:
    adjust a configuration of at least one of the storage devices based at least on the real-time telemetry data.

14. The storage controller of claim 13, wherein the configuration of the at least one storage device is adjusted during normal operation of the data storage system.

15. The storage controller of claim 13, wherein the configuration of the at least one of the storage devices affects storage device performance, storage device life, or storage device reliability.

16. The storage controller of claim 12, wherein the processing system is further configured to:
    generate a plurality of telemetry packets; and
    provide the plurality of telemetry packets as a telemetry stream on the telemetry path.

17. The storage controller of claim 16, wherein the one or more taps are configured to capture a subset of the plurality of telemetry packets.

18. The storage controller of claim 12, wherein the generation of real-time telemetry data occurs during normal operation of the data storage system.

19. The storage controller of claim 12, wherein a telemetry packet is generated for each IO command executed by the data storage system.

20. A storage device, comprising:
    a data storage medium; and
    a storage controller, coupled to the data storage medium and configured to store data onto the data storage medium;
    the storage controller further configured to:
      generate a plurality of telemetry packets, wherein a telemetry packet is generated for each IO command executed by the storage device, and wherein each telemetry packet comprises:
        identifying information for a type of event;

identifying information for a source of the telemetry packet;
event specific payload information;
a timestamp; and
a sequence number;

provide the plurality of telemetry packets as a telemetry stream to one or more taps via a telemetry path independent of data and control paths within the storage device;

capture at least one telemetry packet in one or more of the taps; and generate real-time telemetry data based at least on the at least one telemetry packet during normal operation of the storage device.

\* \* \* \* \*